(12) United States Patent
Fujiki

(10) Patent No.: US 7,395,340 B2
(45) Date of Patent: Jul. 1, 2008

(54) INFORMATION PROCESSING METHOD AND INFORMATION PROCESSING DEVICE

(75) Inventor: Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 10/834,032

(22) Filed: Apr. 29, 2004

(65) Prior Publication Data

US 2004/0260822 A1  Dec. 23, 2004

(30) Foreign Application Priority Data

May 8, 2003  (JP) ............................ 2003-130195

(51) Int. Cl.
*G06F 15/16* (2006.01)
(52) U.S. Cl. ...................... 709/229; 709/235
(58) Field of Classification Search ................ 707/102, 707/9; 709/225, 226, 229, 223, 235, 204
See application file for complete search history.

(56) References Cited

U.S. PATENT DOCUMENTS

| 6,189,011 B1 | 2/2001 | Lim et al. | |
| 2003/0107569 A1 | 6/2003 | Endo et al. | 345/419 |

FOREIGN PATENT DOCUMENTS

| EP | 1 475 708 A2 | * 10/2004 |
| JP | 2002-348726 | 12/2002 |

OTHER PUBLICATIONS

European Search Report dated Aug. 2, 2007 for European Application No. 04252667.3-1243.
Jian Zhao et al., "Supporting Flexible Communication in Heterogeneous Multi-User Environments", Proceedings of the International Conference on Distributed Computing Systems, IEEE Comp. Soc. Press, US, vol. Conf. 14, Jun. 21, 1994, pp. 442-449, XP000489106.

* cited by examiner

*Primary Examiner*—Paul H Kang
(74) *Attorney, Agent, or Firm*—Fitzpatrick, Cella, Harper & Scinto

(57) ABSTRACT

Provided is a technique for limiting association of a process to a system where a plurality of processes share data. It is determined whether or not a device itself satisfies a specific condition, and, depending on a result thereof, an instruction to set or release the specific condition is issued to all client devices sharing the data. Further, when the instruction is received, if the received instruction is the instruction to set or release the specific condition, it is then determined whether or not the specific condition is breached. If the device itself breaches the specific condition, then a communication path to a server device is disconnected. If the device itself is not breaching the specific condition, then information relating to the device satisfying the specific condition is updated in accordance with the instruction.

5 Claims, 12 Drawing Sheets

INFORMATION PROCESSING METHOD AND INFORMATION PROCESSING DEVICE

BACKGROUND OF THE INVENTION

1. Field of the Invention

The present invention relates to a technique for a plurality of processes to perform coordinated operations by exchanging data with each other, and more particularly to a technique for restricting processes associated in a shared system.

2. Related Background Art

As an example of a technique in which a plurality of processes perform coordinated operations by exchanging data with each other, there is a database sharing method as disclosed in Japanese Patent Application No. 2002-348726 (information processing method and device). According to the application disclosed in the publication, each process holds a copy of the shared data. If there is an operation request with respect to the shared data, request information about the operation request is exchanged among the processes over a network, and the data is updated based on the received operation request.

In the above-mentioned invention, no restrictions have been made on processes associated in the process group sharing the data. However, a case is conceivable in which processes have to be limited based on some condition, such as a limit on the total number of processes. Thus, there have left room for improvement.

SUMMARY OF THE INVENTION

In order to solve the above-mentioned problem, the present invention provides the following construction.

The present invention provides an information processing method applicable to an information processing device which shares data with another device by communicating with the other device through a device having a server function. The method includes the steps of: determining whether or not an input process is a process for entering into a system which shares the data; generating an event which contains identification information of the information processing device, and sending the event to the device having the server function, in a case where the input process is the process for entering into the system which shares the data; receiving the event from the device having the server function; determining whether or not the number of the processes which have entered into the system is smaller than a predetermined number: determining whether or not the identification information contained in the received event indicates the information processing device; disconnecting a connection path to the device having the server function in a case where the number of the processes which have entered into the system is not smaller than the predetermined number and the identification information contained in the received event indicates the information processing device; ending the received event in a case where the number of the processes which have entered into the system is not smaller than the predetermined number and the identification information contained in the received event does not indicate the information processing device; and executing the received event in a case where the number of the processes which have entered into the system is smaller than the predetermined number.

Further, the present invention provides an information processing method applicable to an information processing device capable of communicating with another device via a device having a server function, the method including the steps of: determining whether or not a given condition is satisfied; sending, in a case where a result from the given condition determining step indicates that the given condition is satisfied, to the device having the server function, given condition set information containing at least identification information of a predetermined terminal and information indicating that the given condition to be set; sending, in a case where a result from the given condition determining step indicates that the given condition is not satisfied, to the device having the server function, given condition release information containing at least identification information of the predetermined device and information indicating the given condition is to be released; receiving information from the device having the server function; determining whether or not the device itself commits a given condition breach that is a breach of the given condition, in a case where the information received in the receiving step is the given condition set information or the given condition release information; disconnecting a communication path between the device itself and the device having the server function in a case where a result of the given condition breach determining step indicates that the given condition is breached; and updating information relating to the device that satisfies the given condition in a case where the result of the given condition breach determining step indicates that the given condition is not breached.

DESCRIPTION OF THE PREFERRED EMBODIMENTS

Hereinafter, detailed explanations are specific according to preferable embodiments of the present invention with reference to the attached diagrams.

First Embodiment

A system according to the present embodiment is a virtual space sharing system, in which a plurality of terminals share a scene database describing a structure and attributes of virtual space. Below, explanation is specific regarding the virtual space sharing system according to the present embodiment.

In the present embodiment, as a condition to limit processes associated in the system, a type of eye view for viewing the virtual space is used. Each process has an eye view for viewing the virtual space. The types of eye views include a subjective eye view and an objective eye view. The subjective eye view is based on a position and an orientation at a user's eye view. That is, the subjective eye view is an eye view where the eye view's position and direction of observation can move. For example, a 3-dimensional position/orientation sensor can be worn on the head of a user of the system, and the eye view's position/direction of observation can be calculated and set based on the output from the sensor. On the other hand, the objective eye view is an eye view where the eye view's position and direction of observation are fixed. In the present embodiment, association of the processes is limited such that the number of processes having the subjective eye view does not exceed a predetermined number. In the following explanations, an elemental condition for determining whether or not to limit process from associating in the system is called a specific condition. In the case of the present embodiment, an indication that (a process) has a subjective eye view corresponds to the specific condition.

Figure 1:
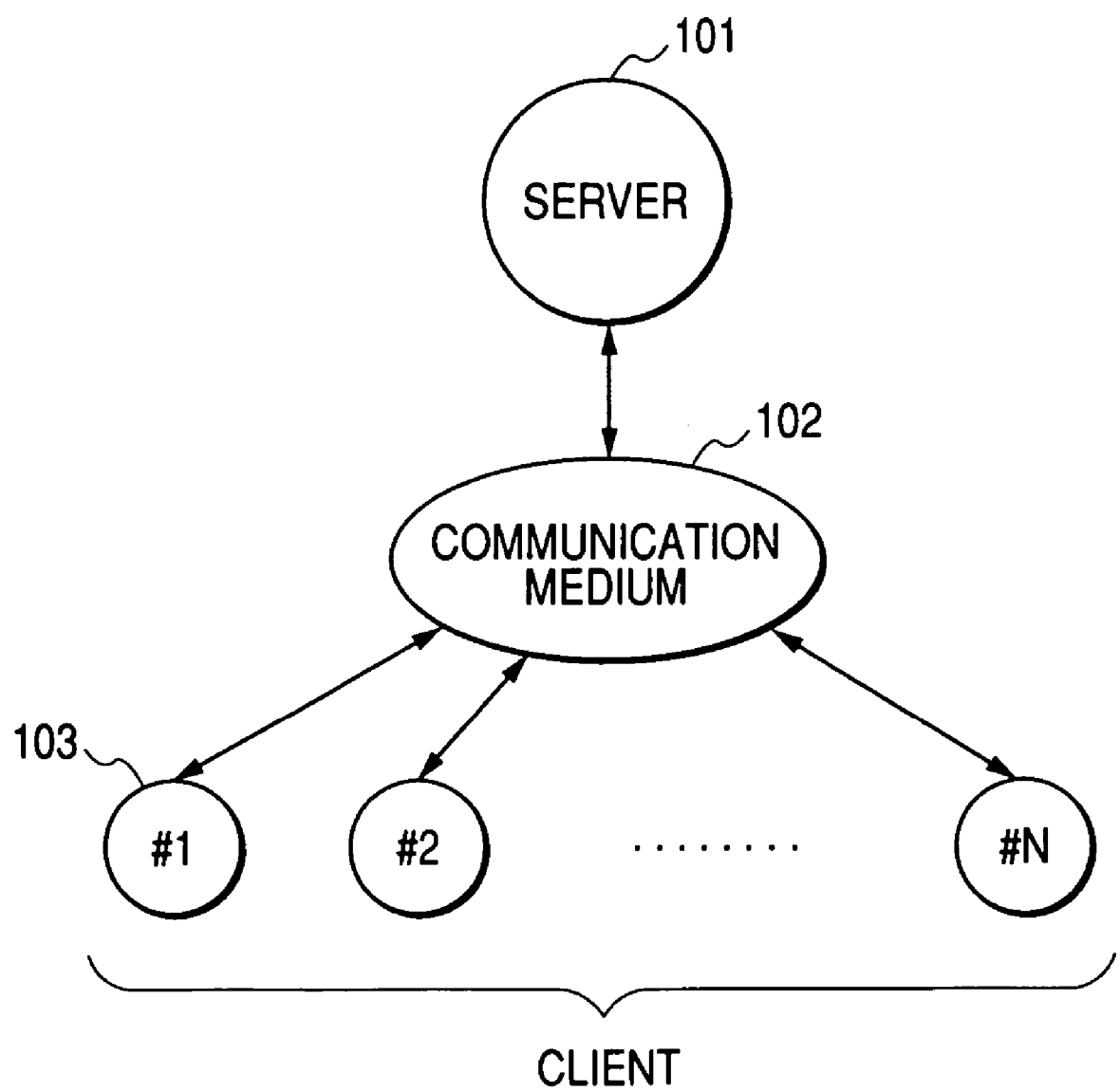
FIG. 1 is a diagram showing an outline construction of a virtual space sharing system according to a first embodiment of the present invention.

FIG. 1 is a diagram showing an outline construction of the virtual space sharing system according to the present embodiment. The system is constituted by a server device 101 and a plurality of client terminal devices (in the diagram, client terminal device 1 to client terminal device N). The server device 101 and the client terminal devices can communicate via a communication medium 102. Furthermore, each of the client terminal devices has therein a scene database describing the structure and attributes of the virtual space.

In the present embodiment, the communication medium 102 is a LAN built on an Ethernet (trademark registration). However, the communication medium may also be other information transmitting media, such as USB, Firewire (trademark registration), etc. Furthermore, the configuration of the network is not limited to a LAN, but may also be a configured connected via a WAN, or by using both a LAN and a WAN.

Here, explanation is specific regarding a term database operation which is used in the following explanations. Database operation refers to processing for rewriting content in the database. The database operation is divided into 2 stages: operation instruction and operation execution. The operation instruction is a request to update the database, where actual rewriting is not performed. The actual rewriting of the database is performed at the database execution stage. In the following explanations, the simple term operation refers to the database operation unless particularly specified. If the subject of the operation is anything other than the database, an explanation will be specific to indicate the subject of the operation, as in operation of a communication device by the user. Furthermore, database operation instructions and network connection status modification instructions are both called instructions. Network connection status modification instructions include a connection instruction for establishing a client-server connection, and a disconnect instruction for disconnecting the connection.

Note that, while the instruction is generated by the user in some cases, there are also instances where the instruction is generated by an operation of a program executed within the client terminal device. As an example of the former, when the user operates a mouse or other communication device to move a virtual object, the instruction is generated. As an example of the latter, in a system for a shooting game where a game program that is executed on the client moves/rotates enemy characters according to an algorithm, the instruction is generated.

Figure 2:
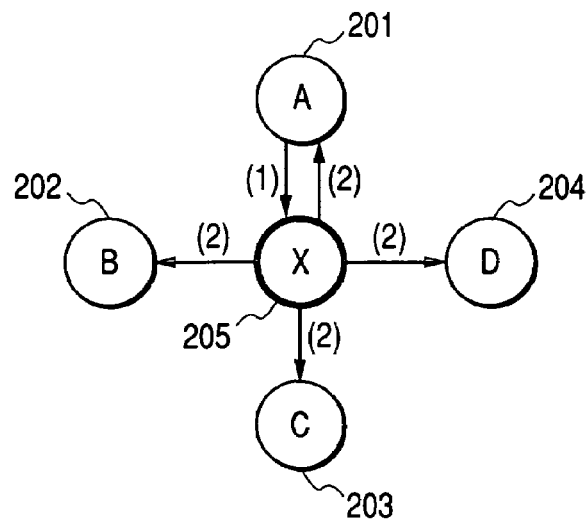
FIG. 2 is a diagram showing a basic flow of information for updating a database in the system according to the first embodiment of the present invention.

FIG. 2 is a diagram showing a basic flow of information for updating the database in a system according to the present embodiment. In the diagram, reference symbols A, B, C and D indicate client terminal devices, and X indicates a server device. It is assumed that the client terminal device A has just performed the operation instruction for the shared scene database. Data indicating the content of the operation instruction is sent via the network to the server device X. (In the diagram, (1) indicates the transmission of the data from the client terminal device A to the server device X.)

The server device X receives the operation instruction and distributes the data sent from the client terminal device A to all the client terminal devices (A, B, C, D). (In the diagram, (2) indicates the transmission of the data from the server X to all the client terminal devices.)

These processes enable the client terminal devices B, C, D to learn the content of the operations performed by the client A. Note that, the content of the operation instruction may include at least information for specifying the subject of the operation, and information for specifying the type of operation. Depending on the type of operation, the operation instruction may also include parameters necessary for executing the operation.

Figure 3:
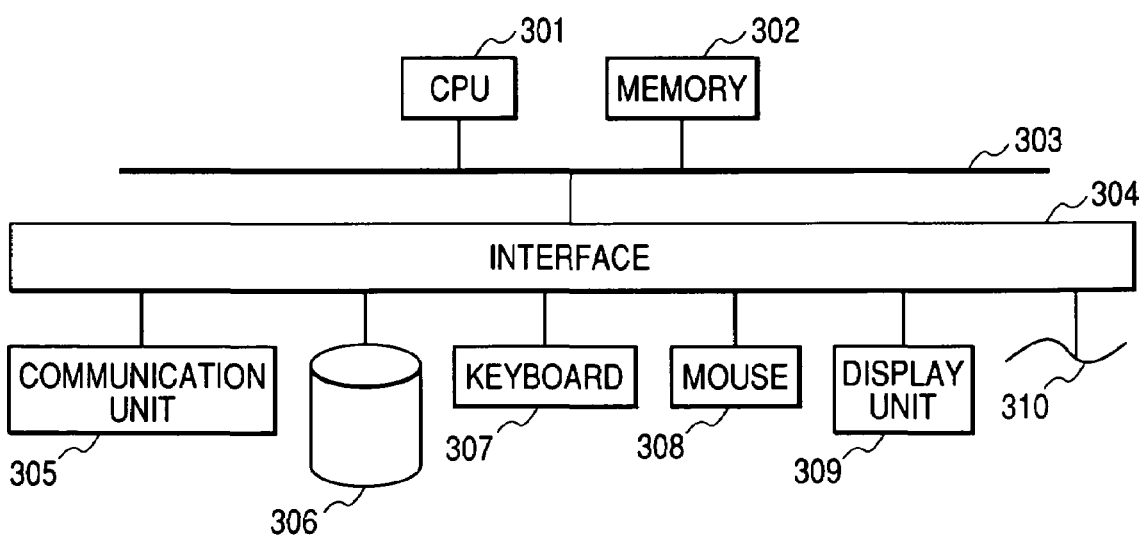
FIG. 3 is a block diagram showing a basic construction of a server device and a client terminal device.

FIG. 3 is a block diagram showing the basic construction of the server device and the client terminal devices. Reference numeral 301 represents a CPU, which performs controls on the server device or the client terminal devices overall, and also executes instructions inputted from a keyboard 307 or a mouse 308, or executes a program loaded into a memory 302, thus performing processing and the like in accordance with the instructions that are generated.

Reference numeral 302 represents the memory, which has an area for temporarily holding data including a program loaded from an external storage device 306 and the scene database, and also has an area for temporarily holding data, etc. used during the processing. Furthermore, the memory 302 also has an area (a transmission buffer) for temporarily holding data to be sent via a communication unit 305 to the external area, and an area (a receiving buffer) for temporarily holding received data, etc.

Furthermore, the memory 302 also has area for holding specific condition data, which relates to the specific condition. The specific condition data is a list of identification numbers for identifying the individual processes. This list stores the identification numbers of the processes which satisfy the specific condition, which is to say the processes which have the subjective eye view. The length of the list serves as a maximum value for the number of processes which can have the subjective eye view. Note that, the maximum value is set in advance.

Reference numeral 303 denotes a bus connecting each of the portions shown in the diagram. Reference numeral 304 denotes an interface for connecting the bus 303 to each of the portions described below. Reference numeral 305 denotes the communication unit, which performs data communication with external apparatuses via the communication medium 102.

Reference numeral 306 denotes the external storage device (e.g., a hard disk or other such storage device) for holding the program and data loaded into the memory 302. Furthermore, in a case where the construction shown in FIG. 3 is the server device, the program corresponding to the processing performed by the server device described below is held in the external storage device 306. In a case where the construction shown in FIG. 3 is the client terminal device, the program corresponding to the processing performed by the client terminal device described below is held in the external storage device 306. When needed, these programs are loaded into the memory 302 and are processed by the CPU 301. Reference numerals 307 and 308 represent the keyboard and the mouse, respectively, with which various types of instructions can be inputted to the CPU 301 as well as the above-mentioned instructions.

Reference numeral 309 denotes a display unit, which can display processing results from the CPU 301. For example, an image of the virtual space shared by the client terminal devices can be displayed here.

Reference numeral 310 represents an input/output unit, which connects to the external device to perform input and output of data to/from the device.

Figure 4:
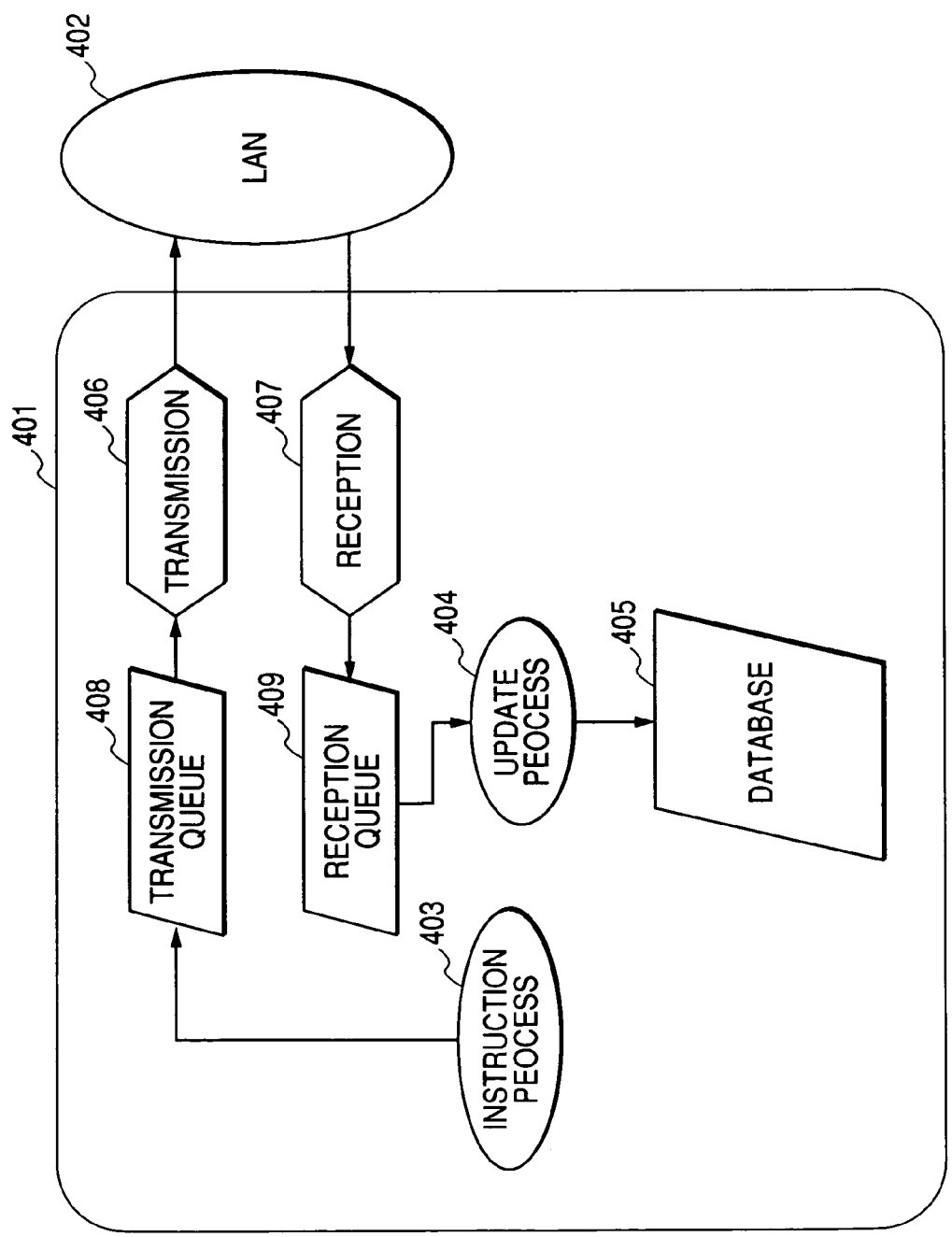
FIG. 4 is a schematic diagram of processes performed inside the client terminal device.

FIG. 4 is a schematic diagram of processing performed within the client terminal device. Arrows indicate the flow of data. Reference numeral 401 indicates the client terminal device. The processing performed by the client terminal device 401 includes an instruction process module 403 for processing instructions, and an update process module 404 for updating the database 405 based on the instructions. Furthermore, reference numeral 406 represents a transmission module for transmitting data to a LAN 402 serving as the communication medium 102. Reference numeral 407 denotes a reception module for performing reception of data from the LAN 402. Exchange of data among these modules is performed via buffers called a transmission queue 408 and a reception queue 409 (which are provided to the memory 302 inside the client terminal device).

Figure 5:
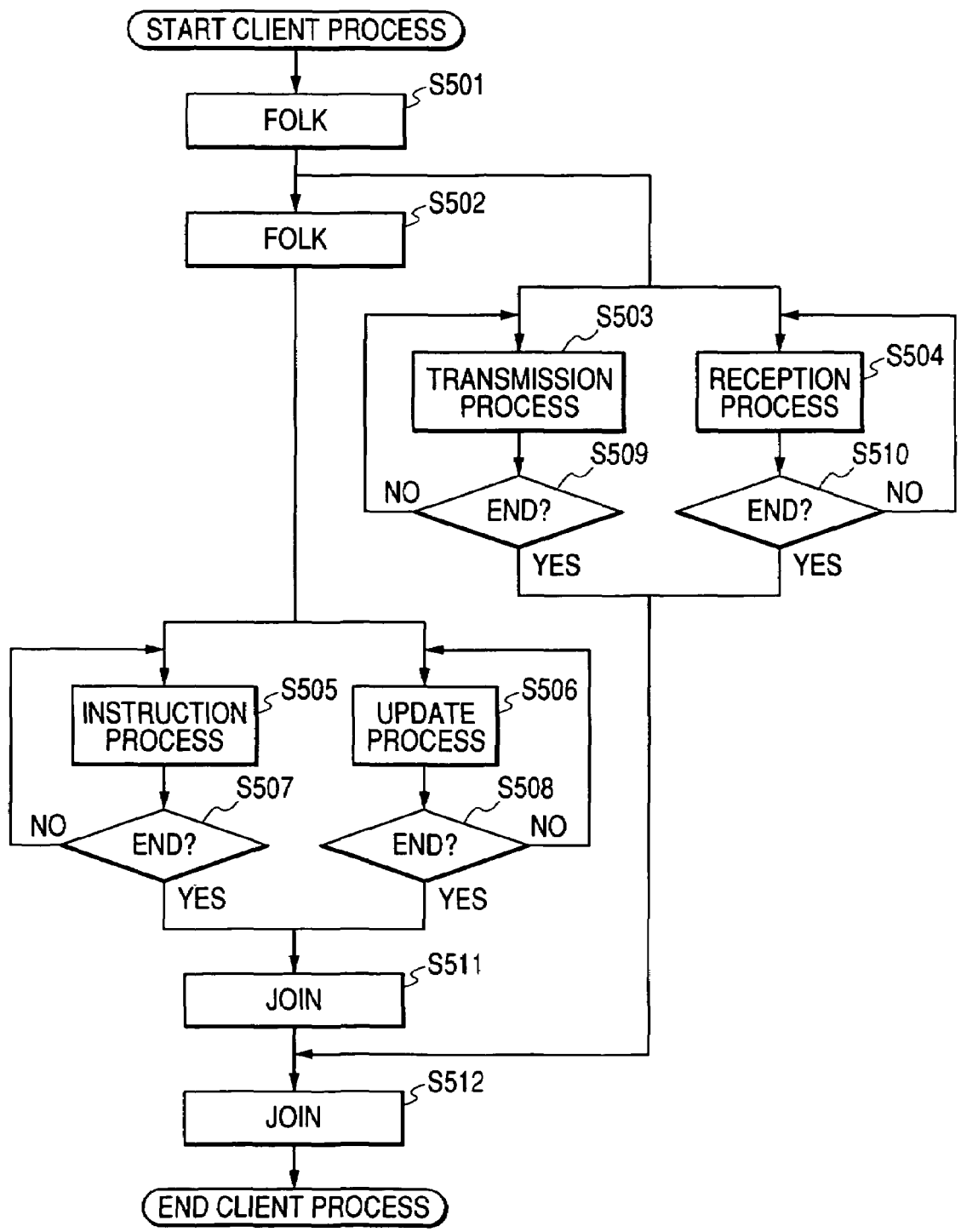
FIG. 5 is a flowchart of main processes performed by the client terminal device according to the first embodiment of the present invention.

FIG. 5 is a flowchart of main processing performed by the client terminal device. Note that a program in accordance with the flowchart of FIG. 5 is stored in the external storage device 306, and, when necessary, is loaded into the memory 302 and executed by the CPU 301. As a result, the client terminal device executes the processing in accordance with the flowchart of FIG. 5.

When the client device is booted up, the processing forks (step S501) to perform transmission processing to transmit data via the communication medium 102 to the server device (step S503), and reception processing to perform reception of data via the communication medium 102 from the server device (step S504). Though not shown in the diagram, CG image generation processing and display window processing are also performed. The CG image generation processing makes a reference to a scene graph database and generates a CG image in virtual space. On the other hand, the display window processing displays the CG image or other information to be provided to the user as a window on the display unit 309, and also processes input operations made by the user on the mouse, keyboard or other communication device with respect to the window. Note that, the CG image generation processing and the display window processing are similar to publicly known CG image generation processing methods and display window processing methods, so detailed explanations thereof are omitted.

Furthermore, in addition to the above-mentioned step, the process forks (step S502) to perform an instruction process for processing instructions (step S505), and an update process for updating the scene graph database (step S506). In the above-mentioned transmission process, reception process, instruction process and update process, a judgment is made to determine whether or not an instruction to end the processing has been generated at step S509, step S510, step S507 and step S508, respectively. If there is no instruction to end, then the processing returns to step S503, step S504, step S505 and step S506 respectively, and the processing continues. On the other hand, if the instruction to end is made, then the foregoing processing ends. Note that, the transmission process, reception process, instruction process and update process are explained in detail below.

Figure 6:
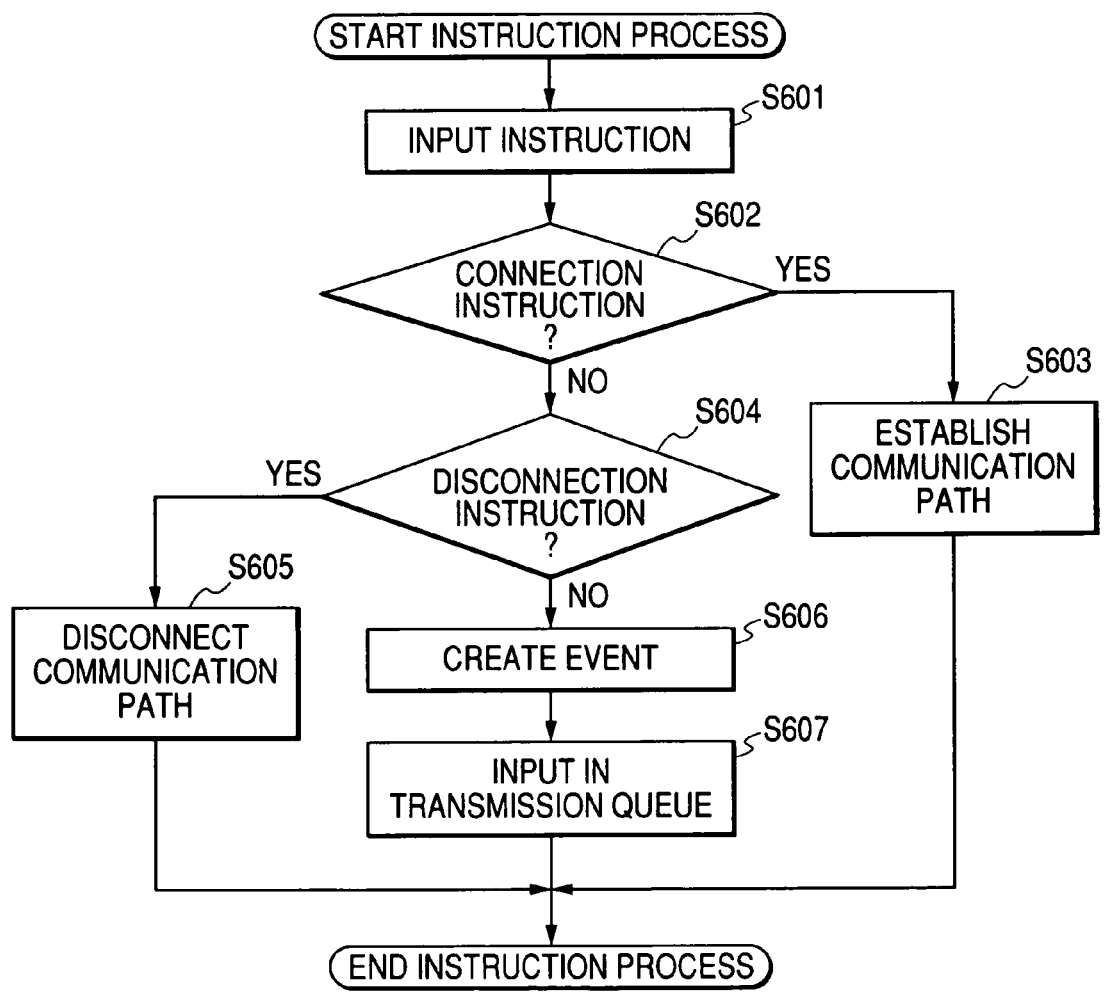
FIG. 6 is a flowchart showing details of processing at step S505.

Next, explanation is specific regarding details of the processing at step S505, which is the instruction processing for processing the instructions. FIG. 6 is a flowchart showing details of the process at step S505.

First, the input of the instruction is detected (step S601). Next, the inputted instruction is interpreted, and it is judged whether the instruction is an instruction (a connection instruction) requesting establishment of a communication path via the communication medium 102 to the server device (i.e., a connection with the server device via the communication medium 102) (step S602). If the instruction is the connection instruction, then the processing advances to step S603, and the communication unit 305 establishes the communication path to the server device, and then the instruction processing ends.

On the other hand, if the instruction is not the connection instruction then the procedure advances to step S604. At step S604, the instruction inputted at step S601 is interpreted, and it is judged whether the instruction is an instruction (a disconnection instruction) requesting disconnection of the communication path via the communication medium 102 to the server device (i.e., disconnection of the connection via the communication medium 102 to the server device). If the instruction is the disconnection instruction, then the processing advances to step S605, and the communication unit 305 disconnects the communication path with the server device, and then the instruction processing ends.

On the other hand, if the instruction inputted at step S601 is not the disconnection instruction (i.e., neither the connection instruction nor the disconnection instruction), then the instruction is determined to be a database operation instruction, and the processing advances to step S606. At step S606, data called an event is created, which indicates the content of the operation instruction.

Then, the event created at step S606 is inputted into the transmission queue 408 provided inside the memory 302 (step S607), and then the processing ends.

The foregoing processing enables the establishment/disconnection of the communication path and the transmission of the instruction based on the type of the instruction.

Figure 7:
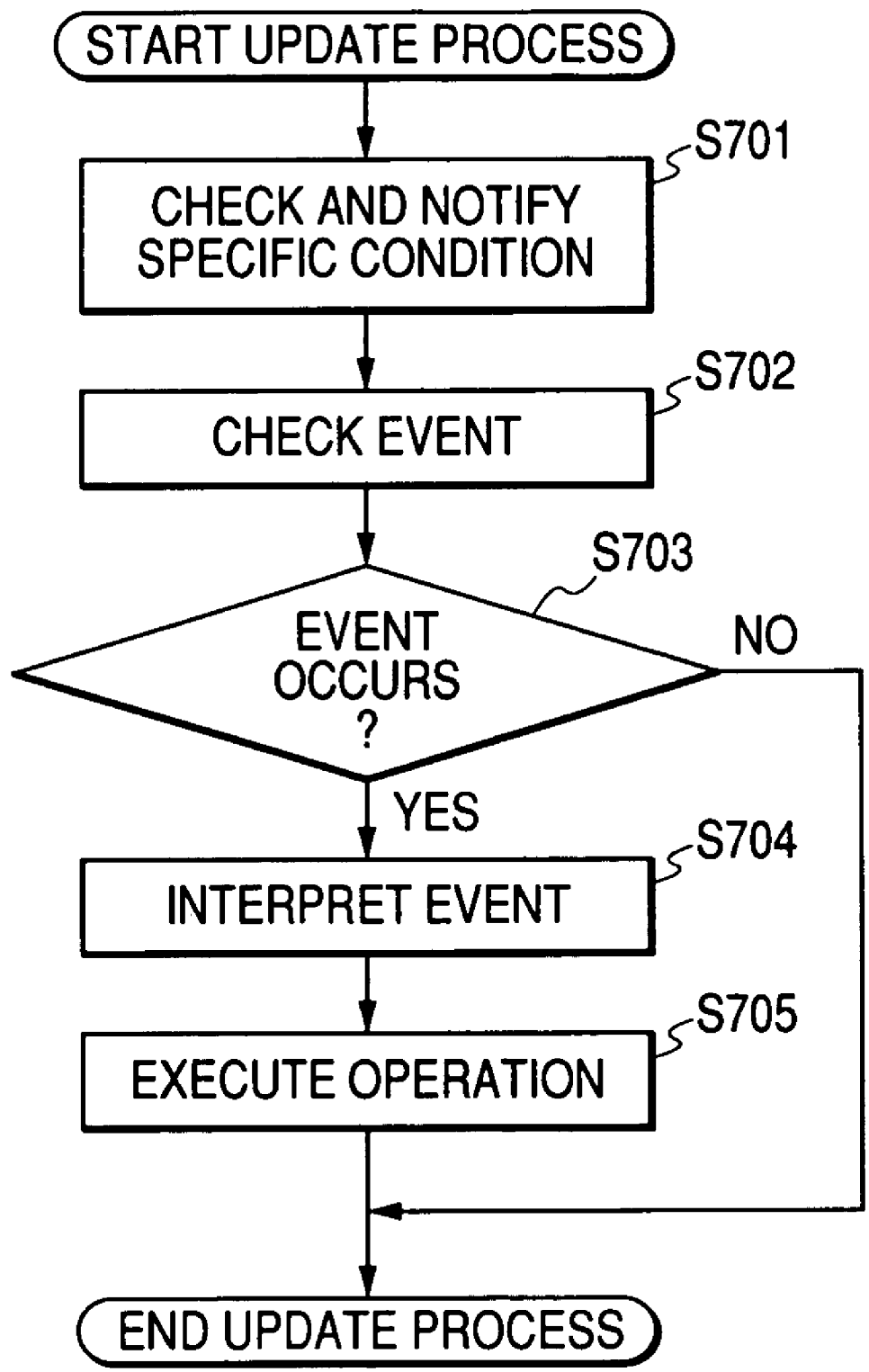
FIG. 7 is a flowchart showing details of processing at step S506.

Next, explanation is specific regarding details of the processing at step S506, which is the update processing to update the database. FIG. 7 is a flowchart showing details of the processing at step S506.

First, a check is performed to determine whether or not the specific condition is satisfied. If the specific condition is satisfied, then the specific condition check/notification processing to notify this to all the processes (step S701) is performed. Step S701 is explained in detail below.

Next, a check is performed to determine the presence/absence of the event within the reception queue 409 provided inside the memory 302 (step S702). If the event is present inside the reception queue 409, then the processing is advanced from step S703 to step S704, and the event inside the reception queue 409 is obtained and interpreted, and the content of the operation instruction is extracted (step S704). Then, the database operation is executed in accordance with the content of the operation instruction that was interpreted (step S705). On the other hand, if it is judged at step S703 that there is no event in the reception queue 409, then the update processing ends. Note that step S705 is explained in detail below.

Figure 11:
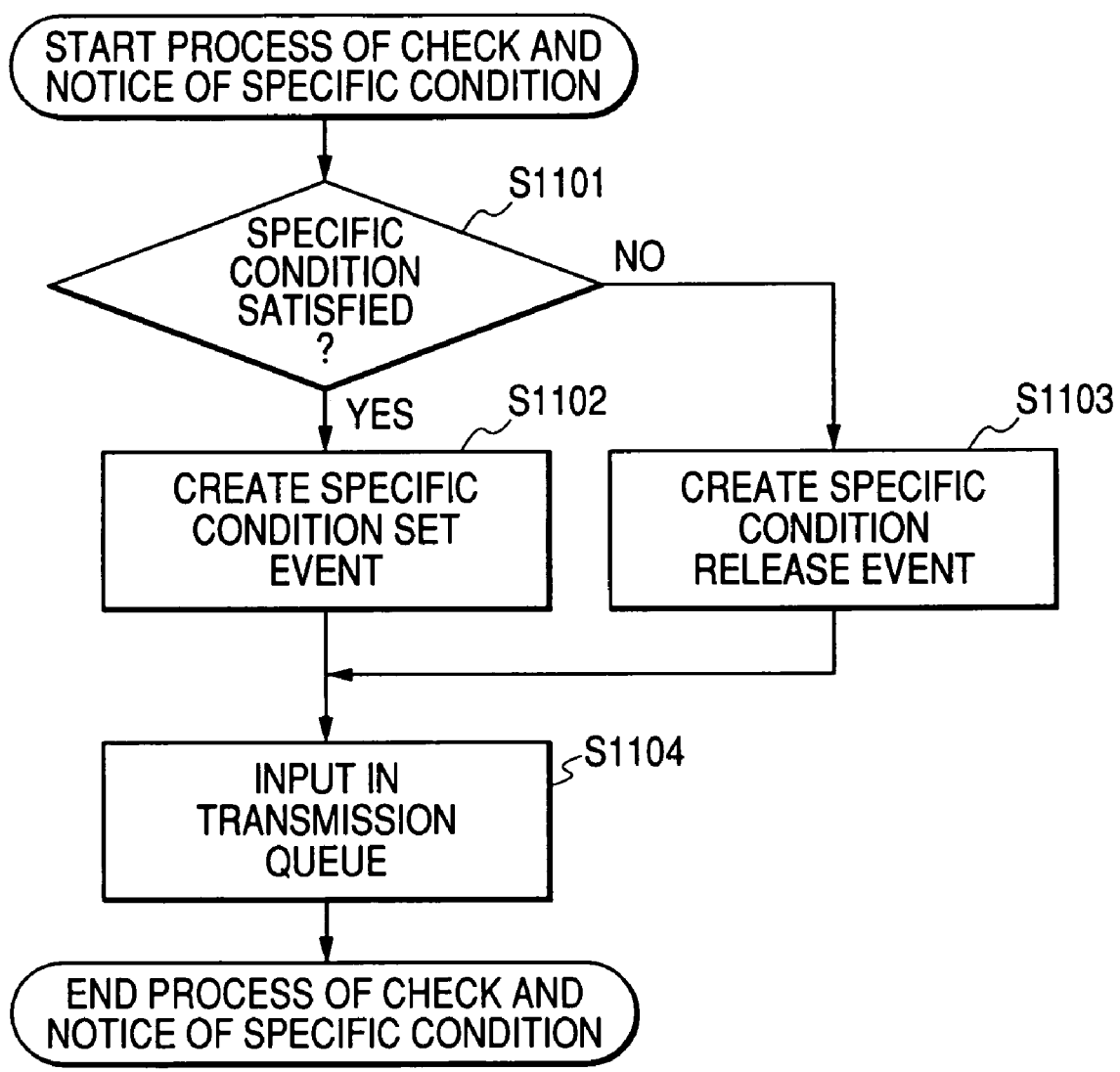
FIG. 11 is a flowchart showing details of processing at step S701.

Here, explanation is specific regarding details of the above-mentioned processing at step S701, which is the specific condition check/notification processing. FIG. 11 is a flowchart showing details of the processing at step S701.

First, at step S1101, it is determined whether or not the specific condition is satisfied with respect to the specific process. In the present embodiment, it is determined whether or not the eye view type is the subjective eye view.

If the specific condition is satisfied, then processing is advanced to step S1102 to create a specific condition set event, which is data for notifying all the processes that the specific process satisfies the specific condition. Then the processing is advanced to step S1104. On the other hand, if the specific condition is not satisfied, then the specific condition release event, which is data for notifying all the processes that the specific process does not satisfy the specific condition, is created (step S1103). Then the processing is advanced to step S1104.

At step S1104, the event created at either step S1102 or at step S1103 is then inputted into the transmission queue 408 provided inside the memory 302, and then the specific condition check/notification processing ends.

In the following explanations, the above-mentioned specific condition set event and the specific condition release event are both referred to as a specific condition instruction event. The specific condition instruction event may include, at least, an identification number of a transmission source process, information for differentiating between the specific condition instruction event and another event type, and information for designating setting/releasing of the specific condition.

Figure 12:
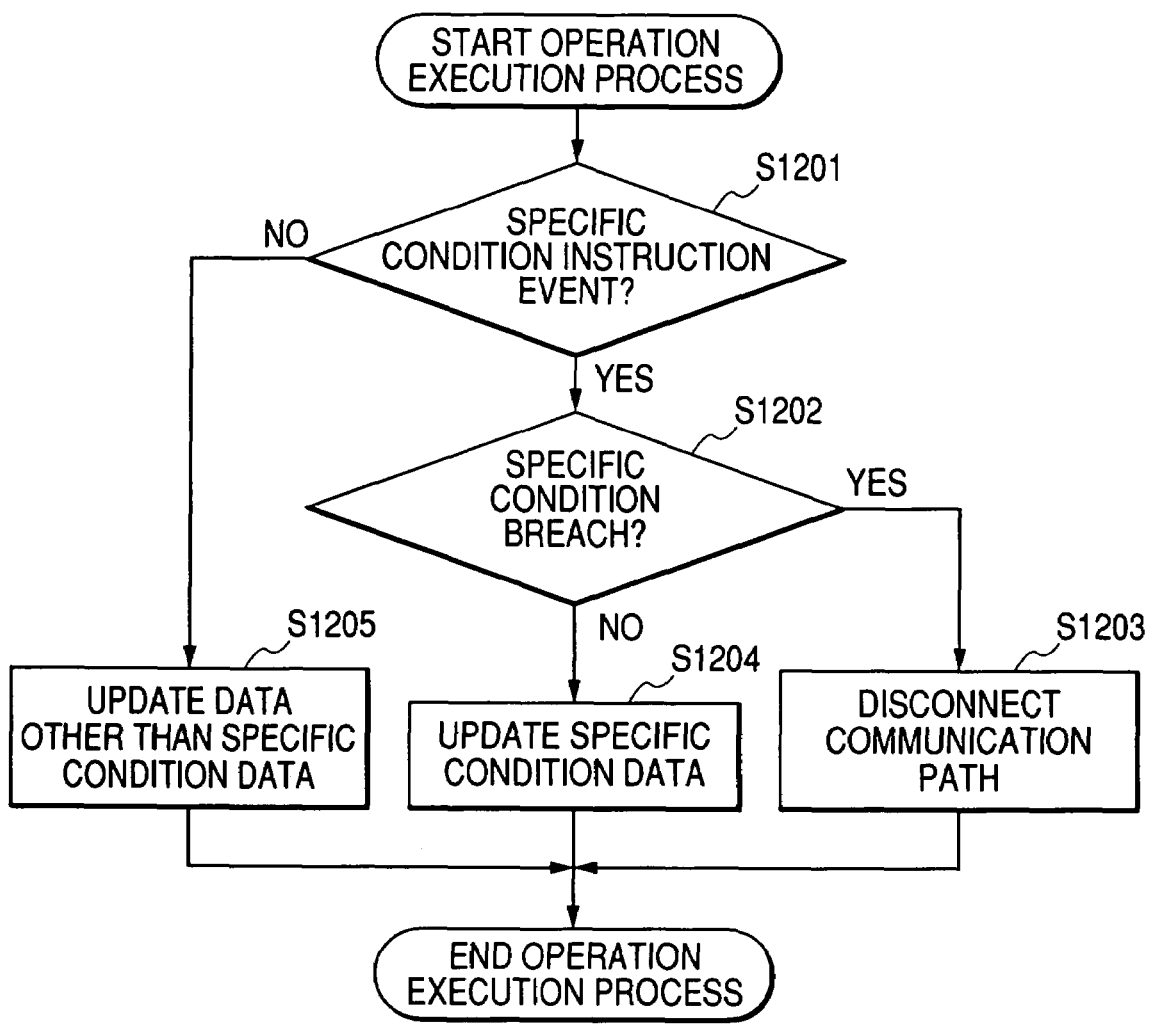
FIG. 12 is a flowchart showing details of processing at step S705.

Next, explanation is specific regarding details of the above-mentioned processing at step S705, i.e., the operation execution processing. FIG. 12 is a flowchart showing details of the operation execution processing.

First, at step S1201, it is determined whether the event interpreted at step S704 is the specific condition instruction event. If it is the specific condition instruction event, then the processing is advanced to step S1202 where it is determined whether or not the specific process breaches the specific condition. Namely, if the following four conditions (three rules (1)-(3) relating to the above-mentioned specific condition, and a determination of whether or not it is the specific process itself (4)) are simultaneously satisfied, then it is determined that the specific condition is breached since the specific process itself is attempting to set the subjective eye view in excess of the maximum value. In any other case, it is determined that the specific condition is not breached:

(1) The specific condition instruction event type is the specific condition set event.

(2) With respect to the specific condition data stored in the memory 302, the number of processes with subjective eye views is the same as the maximum value set in advance.

(3) The transmission source process identification number indicated by the specific condition instruction event is not included in the list of the subjective eye view processes.

(4) The transmitter of the specific condition instruction event is the specific process itself.

If it is determined at step S1202 that the specific condition is breached, then the processing is advanced to step S1203 and the communication path via the communication medium 102 to the server device is terminated, and then the operation execution processing ends. On the other hand, if the specific condition is not breached, the processing advances to step S1204. At step S1204, a determination is made with respect to the following rules, and the specific condition data that is stored in the memory 302 is updated (i.e., added or deleted).

More specifically, if the following three conditions (i), (ii) and (iii) are satisfied simultaneously, then the transmission source process identification number shown in the specific condition instruction event is added to the list of processes using the subjective eye view:

(i) The specific condition instruction event type is the specific condition set event.

(ii) With respect to the specific condition data stored in the memory 302, the number of processes with subjective eye view is less than the maximum value set in advance.

(iii) The transmission source process identification number indicated by the specific condition instruction event is not included in the list of the subjective eye view processes, or, if the following two conditions (I) and (II) are satisfied simultaneously, then the transmission source process identification number indicated by the specific condition instruction event is deleted from the list of the subjective eye view processes:

(I) The specific condition instruction event type is the specific condition release event.

(II) The transmission source process identification number indicated by the specific condition instruction event is included in the list of subjective eye view processes.

As described above, when (i), (ii) and (iii) are simultaneously satisfied, or when (I) and (II) are simultaneously satisfied, the specific condition data stored in the memory 302 is updated at step S1204. In any other case, the specific condition data is not updated at step S1204. When the above-mentioned processing in step S1204 ends, the operation execution processing ends.

If it is determined at step S1201 that the event is not the specific condition instruction event, then the processing advances to step S1205 and the scene database in the memory 302 is updated in accordance with the event content, and the operation execution processing ends.

Figure 8:
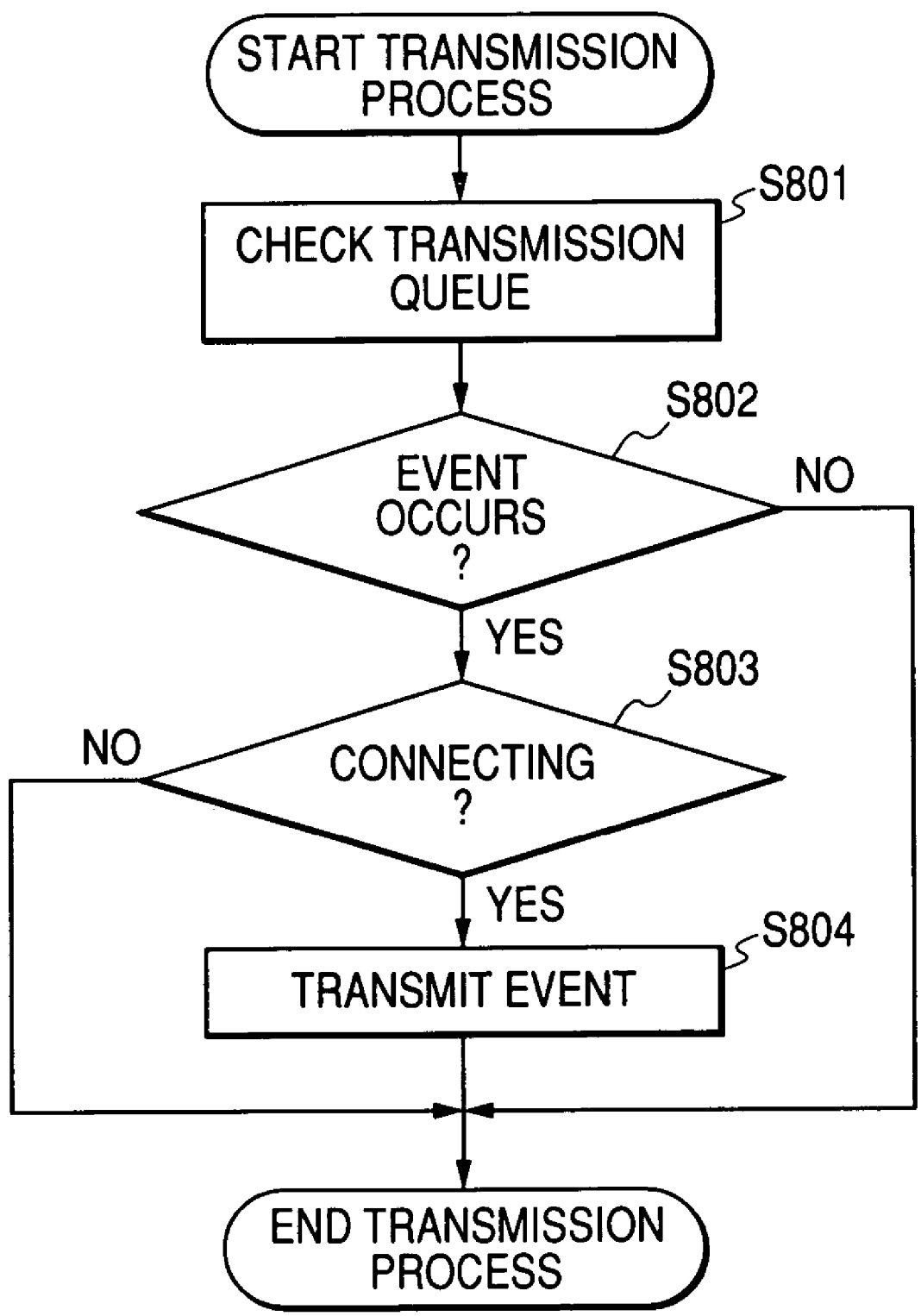
FIG. 8 is a flowchart showing details of processing at step S503.

Next, explanation is specific regarding details of the above-mentioned processing at step S503, i.e., the transmission processing for transmitting data to the server device via the communication medium 102. FIG. 8 is a flowchart showing details of the processing at step S503.

First, a check is performed to determine the presence/absence of the event inside the transmission queue 408 provided inside the memory 302 (step S801). If the event is present inside the transmission queue 408, then the processing is advanced from step S802 to step S803, and a check is performed to determined whether or not the communication path between the client terminal device and the server device has been established (step S803). If the communication path is established, then the event inside the transmission queue 408 is transmitted to the server device.(step S804). On the other hand, if the communication path is not established, then the transmission processing ends.

Figure 9:
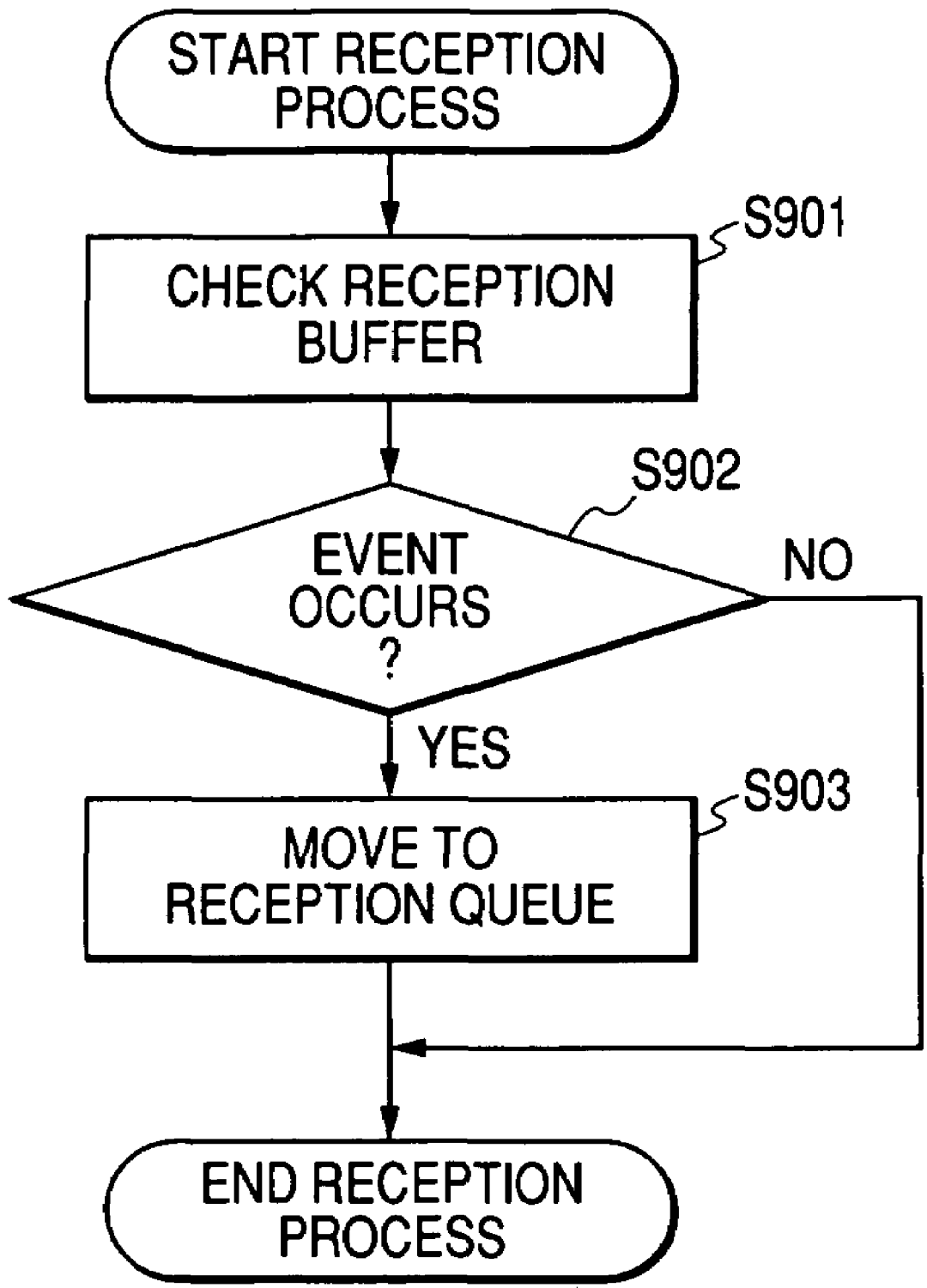
FIG. 9 is a flowchart showing details of processing at step S504.

Next, explanation is specific regarding details of the above-mentioned processing at step S504, i.e., the reception processing for receiving the data from the server device via the communication medium 102. FIG. 9 is a flowchart showing details of the processing at step S504.

First, a check is performed to determine the presence/absence of the event inside the reception buffer for temporarily storing the event data sent from the server device, which is provided inside the memory 302 (step S901). If the event is present inside the reception buffer, then the processing is advanced from step S902 to step S903, and the event data inside the reception buffer is moved to the reception queue 409 (step S903). On the other hand, if the event is not present in the reception buffer, the reception processing ends.

Figure 10:
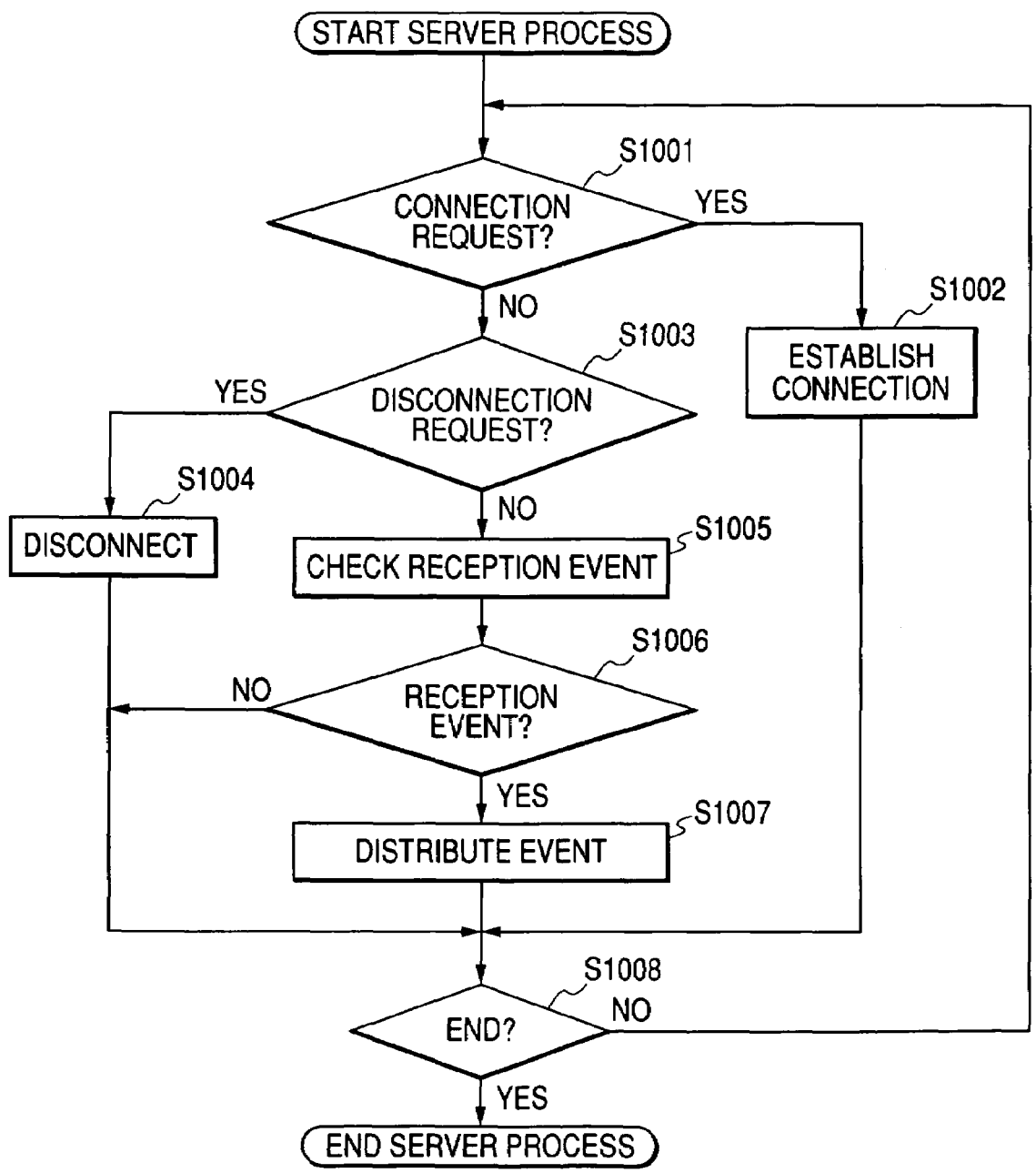
FIG. 10 is a flowchart of main processes performed by the server device according to the first embodiment of the present invention.

Next, explanation is specific regarding processing performed by the server device. FIG. 10 is a flowchart of main processing performed by the server device. Note that a program in accordance with the flowchart shown in the diagram is stored in the external storage device 306. When needed, the program is loaded in the memory 302 and executed by the CPU 301. As a result, the server device executes processing in accordance with the flowchart shown in the diagram.

First, the server device determines whether or not the communication path establishment request has been sent from the client terminal device (step S1001). If the request has been sent, the processing is advanced to step S1002 and the communication path is established to the client terminal device that was the request source (step S1002).

On the other hand, if the connection request has not been sent, then the server device determines whether or not the communication path disconnection request has been sent from the connected client terminal device (step S1003). If the request has been sent the processing is advanced to step S1004 and the communication path to the client terminal device that was the request source is disconnected (step S1004).

On the other hand, if the disconnection request has not been sent, then the processing is advanced to step S1005 and a check is performed to determined whether or not any event was received from the client terminal device (step S1005). If it is determined that there is a reception event (step S1006), then the processing is advanced to step S1007, and after the reception event is distributed to each client terminal device the processing is advanced to step S1008.

On the other hand, if there is no reception event (step S1006), then the processing is advanced to step S1008. At step S1008, it is determined whether or not there is an instruction to end the program. If there is the instruction to end the program, the program is ended. On the other hand, if there is no ending instruction, the processing is returned to step S1001 and the subsequent processing is then continued.

Figure 13:
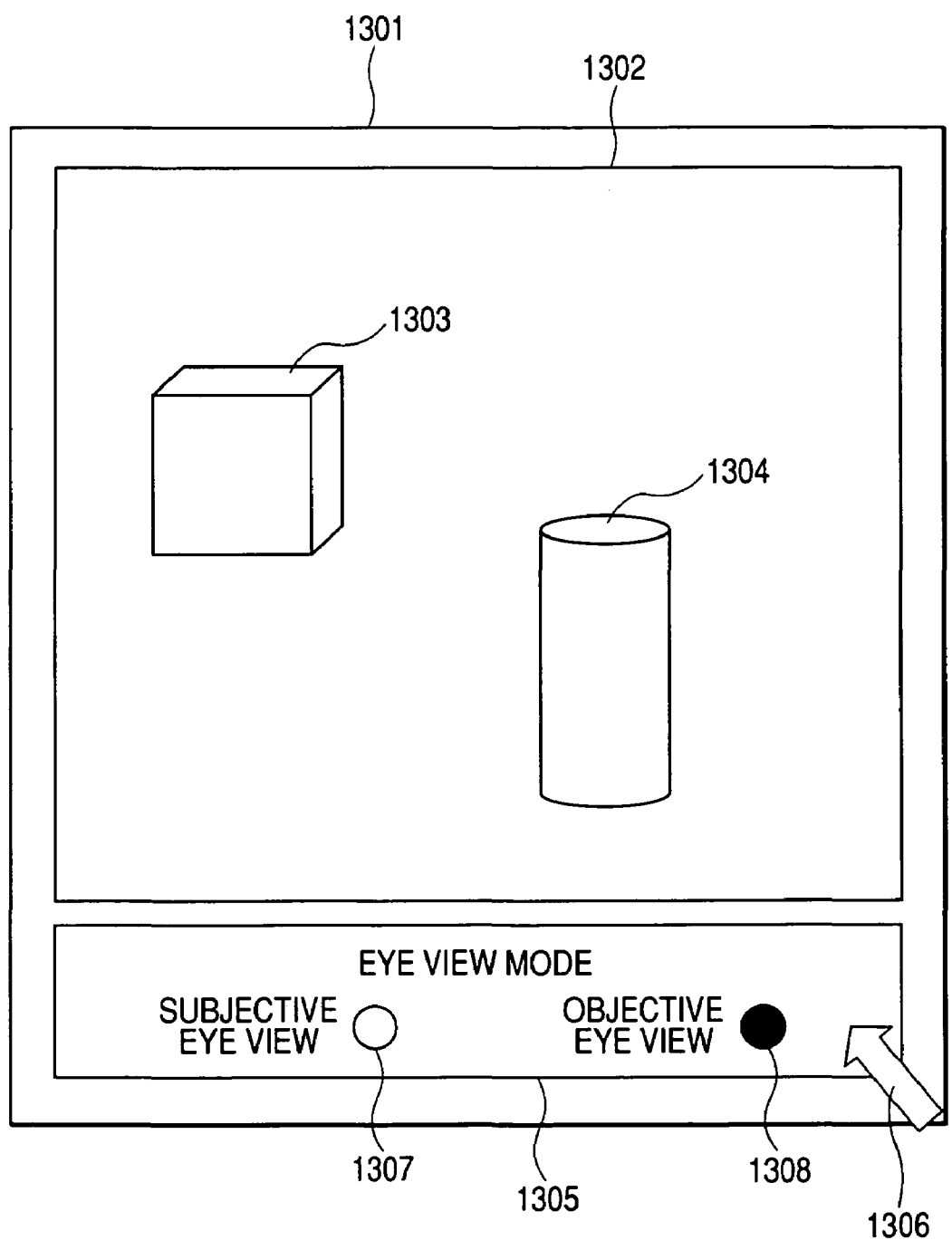
FIG. 13 is a diagram showing an example of a screen displayed on a display unit 309 of the client terminal device according to the first embodiment of the present invention.

Here, explanation is specific regarding a method for setting the type of the eye view. FIG. 13 is a diagram showing an example of a screen displayed on the display unit 309 of the client terminal device. The content of the database is data in 3-dimensional virtual space. Therefore, in a 3-dimensional space display unit 1302 of the display window 1301, there are displayed CG images of 3-dimensional virtual objects 1303 and 1304 according to data in this 3-dimensional virtual space.

Furthermore, in a lower portion of the 3-dimensional space display unit 1302, there is provided an eye view mode setting portion 1305 for setting the type of eye view (subjective eye view or objective eye view). In the eye view mode setting portion 1305, there are displayed radio buttons 1307 and 1308 corresponding to the subjective eye view and the objective eye view. In order to set the eye view mode, the user of the terminal operates the mouse 308. After making a cursor 1306 indicate the radio button corresponding to the desired mode (the radio button 1307 for the subjective eye view, or the radio button 1308 for the objective eye view) among the radio buttons on the eye view mode setting portion 1305, the user presses the left button of the mouse 308 to validate the radio button. Note that the data shown in the selected eye view mode is stored in the memory 302.

The keyboard 307 may also be used for the operations, and there are no particular restrictions as to the method of operation thereof.

The operations for setting the above-mentioned eye view mode are processed in processing steps by mouse operations or keyboard operations relating to display window screen processing, which is not shown in the diagrams.

The method of setting the eye view mode is not particularly limited to communicative operations. Instead, it is also possible to execute a program to make a determination based on a freely selected algorithm, whereby setting the eye view mode that was determined.

In the construction described above, the communication path is disconnected by the process itself which is trying to set the subjective eye view in excess of the predetermined number. This enables the restriction of the number of subjective eye view processes associated in the shared database system. Moreover, since the server device limits the number of processes, no special constructions are required.

In the present embodiment, the specific condition is defined as having the subjective eye view, and the condition for limiting the process' association in the system is defined as the number of processes having subjective eye views exceeds the maximum value. However, it is clear that the conditions are not limited to these definitions.

Furthermore, if the information relating to the database update request is transmitted to all the processes and the database is updated based on all the information received by each process, then the sequence of the database operations does not have to be limited to that in the above-mentioned explanations.

As explained above, according to the present embodiment, the association of the process in the group of processes sharing the data can be limited by the device that has the server functions based on the specific condition, without having to perform special processing.

Second Embodiment

The system construction according to the first embodiment was a server-client construction, but the present invention is not limited to this construction. For example, by having each of the client terminal devices serve roles as clients while also providing the function of the server (the function of receiving the connection/disconnection requests and the function of distributing the data to the clients), it becomes possible to obtain effects similar to the embodiment described above, in a construction where each client terminal device connects to all of the other client terminal devices.

Third Embodiment

In the first through second embodiments, the shared data was the scene data expressing the structure and attributes of the virtual space. However, the present invention is not limited to this construction, but may be applied with various types of data as the shared data.

Furthermore, it is sufficient if the specific condition data that is mentioned above is included in the shared data; other types of data need not necessarily be present.

It goes without saying that the object of the present invention can also be achieved by that in a system or device, a storage medium is provided in which a program code of software for realizing the functions of the above-mentioned embodiments is recorded and a computer (or CPU or MPU) in the system or the device reads out the program code stored in the storage medium and executes the program.

In such a case, the program code itself, which is read out from the storage medium, achieves the functions of the above-mentioned embodiments. As such, the storage medium storing the program code constitutes the present invention. A server program, which is a program having the functions of the above-mentioned server terminal, and a client program, which is a program having the functions of the client terminal, can operate either alone or in plurality on a single terminal. Furthermore, in the case where a plurality of programs are executed on a single terminal, the server program and the client program can be combined freely.

The storage medium for supplying the program code can be, for example, a flexible disk, a hard disk, an optical disk, an opto-magnetic disk, a CD-ROM, a CD-R, a magnetic tape, a nonvolatile memory card, a ROM, etc.

Furthermore, it goes without saying that the present invention includes not only the case where the program read out by the computer is executed to realize the functions of the above-mentioned embodiments, but also a case where an OS (operating system) or the like running on the computer performs a part or all of the actual processing based on instructions from the program code and this processing achieves the functions of the above-mentioned embodiments. Note that, the above-mentioned program may be executed as a process managed by the OS, or may be executed within a specific process thread.

Furthermore, it goes without saying that the present invention also includes a case where the program code read out from the storage medium is written into a memory provided to a function expansion board that inserted into the computer or a function expansion unit that is connected to the computer, and then a CPU or the like provided to the function expansion board or the function expansion unit performs a part or all of the actual processing and this processing realizes the function of the above-mentioned embodiments.

What is claimed is:

1. An information processing method applicable to an information processing device which shares data with another device by communicating with the other device through a device having a server function, the method comprising the steps of:
    determining whether or not an input process is a process for entering into a system which shares the data;
    generating an event which contains identification information of the information processing device, and sending the event to the device having the server function, in a case where the input process is the process for entering into the system which shares the data;
    receiving the event from the device having the server function;
    determining whether or not the number of the processes which have entered into the system is smaller than a predetermined number;
    determining whether or not the identification information contained in the received event indicates the information processing device;
    disconnecting a connection path to the device having the server function in a case where the number of the processes which have entered into the system is not smaller than the predetermined number and the identification information contained in the received event indicates the information processing device;
    ending the received event in a case where the number of the processes which have entered into the system is not smaller than the predetermined number and the identification information contained in the received event does not indicate the information processing device; and
    executing the received event in a case where the number of the processes which have entered into the system is smaller than the predetermined number.

2. An information processing method according to claim 1, wherein the method is used for sharing a scene database describing a structure and attributes of virtual space among a plurality of devices and the method further comprises the steps of:
    sending an instruction relating to an operation of the scene database to the device having the server function, in response to the instruction relating to the operation of the scene database;
    receiving the instruction relating to the operation of the scene database from the device having the server function; and
    operating, based on the received instruction relating to the operation of the scene database, a scene database stored inside the device itself.

3. An information processing method according to claim 1, wherein
    the shared data includes data of a virtual space, and
    the process for entering into the system which shares the data is a process for controlling a position of eye view.

4. A program stored on a computer-readable medium which causes a computer to execute an information processing method applicable to an information processing device which shares data with another device by communicating with the other device through a device having a server function, the method comprising the steps of:
    determining whether or not an input process is a process for entering into a system which shares the data;
    generating an event which contains identification information of the information processing device, and sending the event to the device having the server function, in a case where the input process is the process for entering into the system which shares the data;
    receiving the event from the device having the server function;
    determining whether or not the number of the processes which have entered into the system is smaller than a predetermined number;
    determining whether or not the identification information contained in the received event indicates the information processing device;
    disconnecting a connection path to the device having the server function in a case where the number of the processes which have entered into the system is not smaller than the predetermined number and the identification information contained in the received event indicates the information processing device;
    ending the received event in a case where the number of the processes which have entered into the system is not smaller than the predetermined number and the identification information contained in the received event does not indicate the information processing device; and
    executing the received event in a case where the number of the processes which have entered into the system is smaller than the predetermined number.

5. An information processing device which shares data with another device by communicating with the other device through a device having a server function, the device comprising:
    a determining unit adapted to determine whether or not an input process is a process for entering into a system which shares the data;
    a generating unit adapted to generate an event which contains identification information of the information processing device, and send the event to the device having the server function, in a case where the input process is the process for entering into the system which shares the data;

a receiving unit adapted to receive the event from the device having the server function;

a determining unit adapted to determine whether or not the number of the processes which have entered into the system is smaller than a predetermined number;

a determining unit adapted to determine whether or not the identification information contained in the received event indicates the information processing device;

a disconnecting unit adapted to disconnect a connection path to the device having the server function in a case where the number of the processes which have entered into the system is not smaller than the predetermined number and the identification information contained in the received event indicates the information processing device;

an ending unit adapted to end the received event in a case where the number of the processes which have entered into the system is not smaller than the predetermined number and the identification information contained in the received event does not indicate the information processing device; and an executing unit adapted to execute the received event in a case where the number of the processes which have entered into the system is smaller than the predetermined number.

* * * * *

UNITED STATES PATENT AND TRADEMARK OFFICE
CERTIFICATE OF CORRECTION

PATENT NO. : 7,395,340 B2
APPLICATION NO. : 10/834032
DATED : July 1, 2008
INVENTOR(S) : Masakazu Fujiki It is certified that error appears in the above-identified patent and that said Letters Patent is hereby corrected as shown below:

SHEET 3

Figure 4, "PEOCESS" (both occurrences) should read --PROCESS--.

SHEET 4

Figure 5, "FOLK" (both occurrences) should read --FORK--.

COLUMN 1

Line 27, "have left" should read --is--.

COLUMN 3

Line 44, "configured connected" should read --configuration connected--.

COLUMN 4

Line 48, "has area" should read --has an area--.

COLUMN 8

Line 50, "to determined" should read --to determine--.
Line 54, "device.(step" should read --device (step--.

COLUMN 9

Line 22, "been sent" should read --been sent,--.
Line 28, "to determined" should read --to determine--.

COLUMN 10

Line 8, "whereby" should read --thereby--.

UNITED STATES PATENT AND TRADEMARK OFFICE
CERTIFICATE OF CORRECTION

PATENT NO. : 7,395,340 B2
APPLICATION NO. : 10/834032
DATED : July 1, 2008
INVENTOR(S) : Masakazu Fujiki It is certified that error appears in the above-identified patent and that said Letters Patent is hereby corrected as shown below:

<u>COLUMN 11</u>

Line 23, "that inserted" should read --that is inserted--.

Signed and Sealed this

Ninth Day of December, 2008

JON W. DUDAS
*Director of the United States Patent and Trademark Office*